United States Patent
Lin et al.

(10) Patent No.: US 11,120,310 B2
(45) Date of Patent: Sep. 14, 2021

(54) DETECTION METHOD AND DEVICE THEREOF

(71) Applicant: ARCSOFT CORPORATION LIMITED, Hangzhou (CN)

(72) Inventors: Chung-Yang Lin, Hangzhou (CN); Hui Deng, Hangzhou (CN)

(73) Assignee: ARCSOFT CORPORATION LIMITED, Hangzhou (CN)

( * ) Notice: Subject to any disclaimer, the term of this patent is extended or adjusted under 35 U.S.C. 154(b) by 64 days.

(21) Appl. No.: 16/180,036

(22) Filed: Nov. 5, 2018

(65) Prior Publication Data
US 2019/0138845 A1   May 9, 2019

(30) Foreign Application Priority Data

Nov. 3, 2017 (CN) .......................... 201711072715.8

(51) Int. Cl.
*G06K 9/00* (2006.01)
*G06K 9/62* (2006.01)
*G06Q 20/20* (2012.01)
*G07G 1/00* (2006.01)

(52) U.S. Cl.
CPC ......... *G06K 9/628* (2013.01); *G06K 9/00624* (2013.01); *G06Q 20/208* (2013.01); *G07G 1/0063* (2013.01)

(58) Field of Classification Search
CPC ................................................... G06K 9/6278
See application file for complete search history.

(56) References Cited

U.S. PATENT DOCUMENTS

| | | | |
|---|---|---|---|
| 10,664,722 B1* | 5/2020 | Sharma | G06K 9/6256 |
| 2011/0043836 A1* | 2/2011 | Yanagisawa | G06K 1/121 |
| | | | 358/1.9 |
| 2016/0110793 A1* | 4/2016 | Herring | G06K 9/00255 |
| | | | 705/26.64 |
| 2017/0249339 A1* | 8/2017 | Lester | G06F 16/56 |
| 2018/0209901 A1* | 7/2018 | Schwartzer | G01N 33/025 |
| 2018/0232602 A1* | 8/2018 | Dey | G06F 16/5854 |
| 2020/0327557 A1* | 10/2020 | Akgul | G06N 3/08 |

FOREIGN PATENT DOCUMENTS

| | | |
|---|---|---|
| CN | 106340137 A | 1/2017 |
| CN | 106991427 A | 7/2017 |
| CN | 107084780 A | 8/2017 |
| WO | WO-2019048924 A1 * 3/2019 ............. G06K 9/036 |

* cited by examiner

*Primary Examiner* — Oneal R Mistry
(74) *Attorney, Agent, or Firm* — Bayramoglu Law Offices LLC

(57) ABSTRACT

This invention provides a detection method and a device thereof which are applied to the field of image processing. The method includes: receiving an image of a target object, acquiring a type of the target object according to a first classifier and the image of the target object, and sending information containing the type of the target object to a display device. The method can automatically prompt a product type, thereby reducing the time of manual recognition and increasing the accuracy of the recognition.

18 Claims, 5 Drawing Sheets

DETECTION METHOD AND DEVICE THEREOF

CROSS REFERENCE TO RELATED APPLICATIONS

This application is based upon and claims priority to Chinese Patent Application No. 201711072715.8, filed on Nov. 3, 2017, the entire contents of which are incorporated herein by reference.

TECHNICAL FIELD

The present invention relates to a method and a device for image processing, particularly, to a detection method and a device thereof which are performed by using a method of image processing.

BACKGROUND

At present, product types need to be manually input when weighing the products in a shopping mall or a supermarket, which is not only time-consuming and labor-intensive, but is also prone to mistakes. The prior art lacks intelligent methods and devices that are enabled to automatically prompt product types.

SUMMARY

The present invention provides a detection method and a device thereof, which can solve the problem that the prior art lacks intelligent methods and devices that are enabled to automatically prompt product types.

In a first aspect, the present invention provides a detection method, and the method includes: receiving an image of a target object; acquiring a type of the target object according to a first classifier and the image of the target object; and sending information containing the type of the target object to a display device.

According to the first aspect of the present invention, for a first executable mode of the first aspect of the present invention, sending information containing the type of the target object to a display device includes: sending information containing the type of the target object to the display device, wherein a confidence level of the information containing the type of the target object is greater than or equal to a first threshold.

According to the first aspect of the present invention, for a second executable mode of the first aspect of the present invention, the method further includes: sending subcategory information under a main category of the type of the target object to the display device.

According to the first aspect of the present invention or the first/second executable mode of the first aspect of the present invention, for a third executable mode of the first aspect of the present invention, the method further includes: sending attribute information related to the type of the target object to the display device.

According to the first aspect of the present invention or any one of the first to third executable modes of the first aspect of the present invention, for a fourth executable mode of the first aspect of the present invention, the attribute information includes at least one item listed below: a price of the target object, a place of origin of the target object, a number of the target object, a stock-in time of the target object and an expiration date of the target object.

According to the first aspect of the present invention or any one of the first to fourth executable modes of the first aspect of the present invention, for a fifth executable mode of the first aspect of the present invention, the expiration date is calculated according to at least one item listed below: the type of the target object, the stock-in time of the target object, a current freshness of the target object, and an air temperature.

According to the fifth executable mode of the first aspect of the present invention, for a sixth executable mode of the first aspect of the present invention, the current freshness of the target object is calculated according to a second classifier and the image of the target object.

According to any one of the fourth to sixth executable modes of the first aspect of the present invention, for a seventh executable mode of the first aspect of the present invention, the method further includes: printing the expiration date.

According to the first aspect of the present invention or any one of the first to seventh executable modes of the first aspect of the present invention, for an eighth executable mode of the first aspect of the present invention, the method further includes: detecting a number of types of target objects according to the first classifier and the image of the target object and sending alarm information to the display device if the number of the types of the target objects is greater than or equal to two.

According to the eighth executable mode of the first aspect of the present invention, for a ninth executable mode of the first aspect of the present invention, detecting the number of the types of the target objects according to the first classifier and the image of the target object and sending the alarm information to the display device if the number of the types of the target objects is greater than or equal to two includes:

detecting the at least one type of the target object according to the first classifier and the images of the target object, and sending the alarm information to the display device if at least one of the following conditions is satisfied: confidence levels of at least two types are greater than or equal to a second threshold, differences between the confidence levels of the at least two types and confidence levels of other types are greater than or equal to a third threshold, and deviations between the confidence levels of the at least two types and the confidence levels of other types are greater than or equal to a fourth threshold.

In a second aspect, the present invention provides a detection device, and the device includes: a receiver, configured to receive an image of a target object; a type acquisitor, configured to acquire a type of the target object according to a first classifier and the image of the target object; and a sender, configured to send information containing the type of the target object to a display device.

According to the second aspect of the present invention, for a first executable mode of the second aspect of the present invention, the sender is specifically configured to send information containing the type of the target object to the display device, wherein a confidence level of the information containing the type of the target object is greater than or equal to a first threshold.

According to the second aspect of the present invention, for a second executable mode of the second aspect of the present invention, the sender is further configured to send subcategory information under the main category of the type of the target object to the display device.

According to the second aspect of the present invention or the first/second executable mode of the second aspect of the present invention, for a third executable mode of the second aspect of the present invention, the sender is further configured to send attribute information related to the type of the target object to the display device.

According to the second aspect of the present invention or any one of the first to third executable modes of the second aspect of the present invention, for a fourth executable mode of the second aspect of the present invention, the attribute information includes at least one item listed below: a price of the target object, a place of origin of the target object, a number of the target object, a stock-in time of the target object, and an expiration date of the target object.

According to the second aspect of the present invention or any one of the first to seventh executable modes of the second aspect of the present invention, for an eighth executable mode of the second aspect of the present invention, the device further includes a detector configured to detect a number of types of target objects according to the first classifier and the image of the target object and send alarm information to the display device if the number of the types of the target objects is greater than or equal to two.

According to the eighth executable mode of the second aspect of the present invention, for a ninth executable mode of the second aspect of the present invention, the detector is specifically configured to detect at least one type of the target object according to the first classifier and the image of the target object, and send the alarm information to the display device if at least one of the following conditions is satisfied: confidence levels of at least two types are greater than or equal to a second threshold, differences between the confidence levels of the at least two types and confidence levels of other types are greater than or equal to a third threshold, and deviations between the confidence levels of the at least two types and the confidence levels of other types are greater than or equal to a fourth threshold.

In a third aspect, the present invention provides a detection system, and the system includes: an image capturing device, a weighing device, a display device and a second processor. The image capturing device is configured to acquire an image of a target object; the weighing device is configured to acquire a weight of the target object; the second processor is configured to acquire a type of the target object according to a first classifier and the image of the target object, and send the type of the target object and the weight of the target object to the display device; and the display device is configured to display the type of the target object and the weight of the target object.

In a fourth aspect, the present invention provides a computer readable storage medium, and the computer readable storage medium stores computer programs. When the computer programs are executed by a third processor, steps of the method described in the first aspect of the present invention and any one of the first to ninth executable modes of the first aspect of the present invention are implemented.

In a fifth aspect, the present invention provides a calibration device including a memory, a fourth processor, and computer programs stored in the memory and executed by the fourth processor. When the computer programs are executed by the fourth processor, steps of the method described in the first aspect of the present invention and any one of the first to ninth executable modes of the first aspect of the present invention are implemented.

The present invention provides a detection method and a device thereof, which are enabled to automatically prompt the product type, thereby reducing the time of manual recognition and increasing the accuracy of the recognition.

DETAILED DESCRIPTION OF THE EMBODIMENTS

Figure 1:
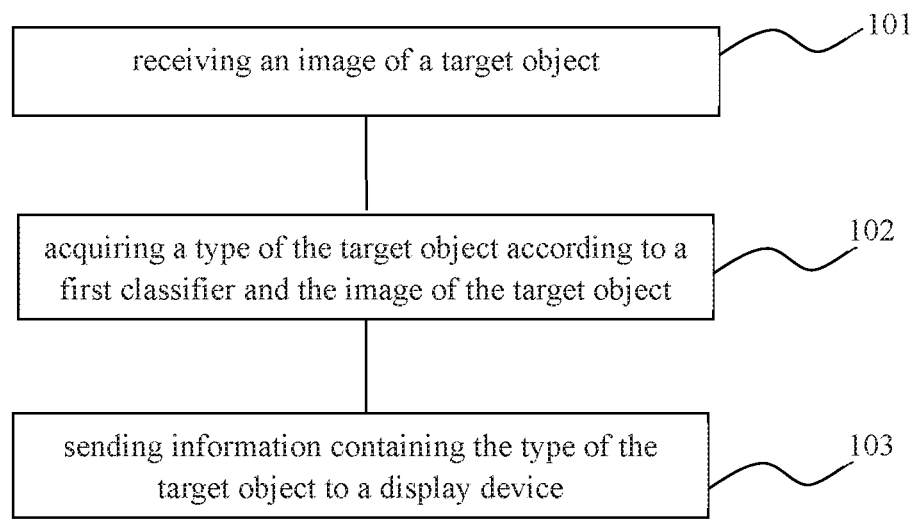
FIG. 1 is a flowchart showing a detection method according to embodiment one of the present invention.

The technical solutions of the embodiments of the present invention will be described in detail hereinafter with reference to the drawings of the embodiments of the present invention.

The terms such as "first", "second", and the like, in the specification, claims, and drawings of the present invention are used to distinguish different objects rather than limit the objects to a specific order.

The term "and/or" in the embodiments of the present invention is merely used to describe an association relationship of associated objects, and it can indicate three cases. For example, A and/or B can be interpreted as three cases, i.e. only A, both A and B, or only B.

In the embodiments of the present invention, the words such as "exemplary" or "for example" etc. are used to indicate the examples, exemplifications, or illustrations. Any embodiment or designed solution described as "exemplary" or "for example" in the embodiments of the present invention should not be construed as more preferred or advantageous over other embodiments or designed solutions. Rather, the use of the words "exemplary" or "for example" etc. is intended to describe relevant concepts in a specific manner.

It should be noted that, for the sake of brevity and clarity of the drawings, the elements shown in the drawings are not necessarily drawn to scale. For example, the sizes of some elements may be enlarged relative to other elements for clarity. Further, where considered appropriate, reference numerals can be repeated over the drawings to indicate corresponding or similar elements.

A detection method according to embodiment one of the present invention is described in detail below with reference to FIG. 1. As shown in FIG. 1, the method includes the following steps.

Step 101, receiving an image of a target object.

The image of the target object may be a normal two-dimensional image, such as a color image or a black-and-white image, and the color image may be an RGB (Red, Green, Blue) image.

Optionally, the receiving action described above may be receiving the image from a storage device, the storage device may be a RAM (Random Access Memory), a flash memory and the like, and the image described above may be an image captured by an image capturing device and stored in the above-mentioned storage device.

The number of the target object described above may be plural, such as a bag of apples.

Step 102, acquiring the type of the target object according to a first classifier and the image of the target object.

The first classifier may be a neural network classifier or a Bayesian network classifier. The neural network classifier or the Bayesian network classifier may be pre-trained, and the output thereof may be types, or at least one type and a confidence level corresponding to the at least one type.

Step 103, sending information containing the type of the target object to a display device.

Optionally, sending information containing the type of the target object to a display device includes: sending information of the type of the target object to the display device, wherein a confidence level of the information of the type of the target object is greater than or equal to a first threshold. Specifically, when the output of the above-mentioned classifier is at least one type and a confidence level corresponding to the at least one type, the first threshold may be set in advance. For example, the first threshold may be set as 0, namely, any possible type information can be sent to the display device to display for the staff to select. The first threshold may also be set as other values to narrow the selection range; or only the type information with the highest confidence level may be sent to the display device; or subcategory information under the main category of the type with the highest confidence level may be sent to the display device. For example, if the type with the highest confidence level is Red Fuji Apple, the type information of the subcategory of Apple (e.g. Red Fuji Apple and Guoguang Apple etc.) is sent to the display device for reference or selection by the staff. Optionally, the classifier may be a Bayesian network classifier.

Optionally, the method further includes: sending subcategory information under the main category of the type of the target object to the display device. Specifically, when the output of the above-mentioned first classifier is type information, the subcategory information under the main category of the output type may be sent to the display device. For example, if the type is Red Fuji Apple, the type information of the subcategory of Apple (e.g. Red Fuji Apple and Guoguang Apple etc.) is sent to the display device for reference or selection by the staff. Optionally, the classifier may be a neural network classifier. The above-mentioned subcategory information may be sent together with the type information of the target object.

The method further includes: sending attribute information related to the type of the target object to the display device. The attribute information includes at least one item listed below: price, place of origin, number, stock-in time, and expiration date of the target object. Specifically, the related attribute information is searched in the database according to the obtained type information and the found attribute information is sent to the display device. For example, when the type information to be sent includes Red Fuji Apple and Guoguang Apple, the information such as the price, place of origin, number, stock-in time, expiration date and the like are searched and sent to the display device. The attribute information described above may be sent together with at least one item listed below: subcategory information described above and/or type information of the target object.

Preferably, the expiration date described above can be calculated according to at least one item listed below: the type of the target object, the stock-in time of the target object, a current freshness of the target object, and an air temperature. The current freshness of the target object is calculated according to a second classifier and the image of the target object. Specifically, the second classifier may be pre-trained by captured pictures of the target objects (e.g. fruits, etc.) with different freshness types. The above-mentioned freshness types may be classified according to different storage times of fruits, vegetables or the like from freshness to corruption. For example, the interval of the storage times of two adjacent types is one week. In this way, the expiration date may also be estimated when the classification is obtained. Moreover, the expiration date may be adjusted according to the effect of air temperature on the freshness of fruits, vegetables, and the like. For example, the adjusted value is obtained by statistical methods. The method further includes printing the above-mentioned expiration date.

The method further includes: detecting the number of the types of the target objects according to the first classifier and the image of the target object and sending alarm information to the display device if the number of the types of the target object is greater than or equal to two. Specifically, when the output of the first classifier is at least one type and a confidence level corresponding to the at least one type, the at least one type of the target object is detected according to the first classifier and the image of the target object, and the alarm information is sent to the display device if at least one of the following conditions is satisfied: confidence levels of at least two types are greater than or equal to a second threshold, differences between the confidence levels of at least two types and confidence levels of other types are greater than or equal to a third threshold, and deviations between the confidence levels of at least two types and confidence levels of other types are greater than or equal to a fourth threshold. Optionally, the deviation described above may be a variance or an equivalent parameter thereof. Optionally, the first classifier may be a Bayesian network classifier. When the first classifier directly outputs the types and there are two or more types, the alarm information is sent to the display device. Optionally, the first classifier may be a neural network classifier. In this way, when a customer mistakenly takes different types of goods (e.g. fruits), he/she can be reminded when the price of the different types of goods in a bag is calculated.

The first classifier described above may be obtained by pre-training according to images of different types of target objects and stored. For example, fruits such as apples, pears, etc. and different types of vegetables etc.

The method of the present invention may be applied to an electronic weighing device used in a supermarket, and only an image capturing device needs to be installed on the electronic weighing device. The method of the present invention may also be applied to other devices, which is not limited in the present invention.

The detection method according to the embodiment of the present invention can automatically prompt the product type, thereby reducing the time of manual recognition and increasing the accuracy of the recognition.

Figure 2:
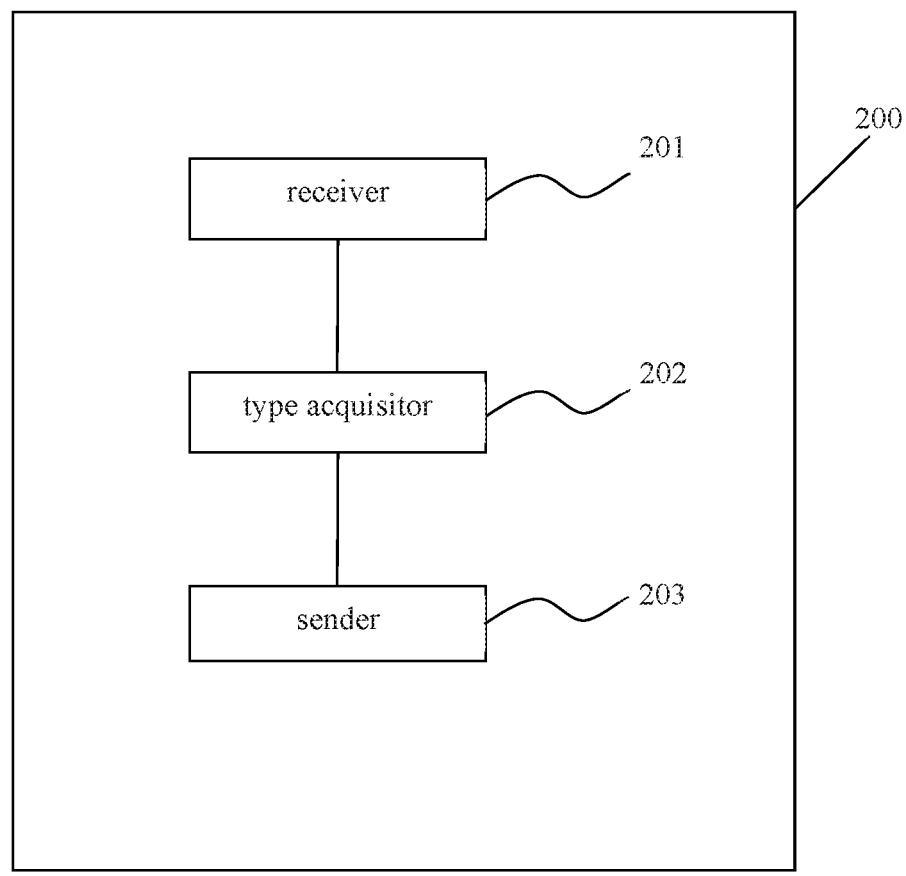
FIG. 2 is a structural schematic diagram of a detection device according to embodiment two of the present invention.

The detection device 200 according to the embodiment two of the present invention is described in detail below with reference to FIG. 2. The device 200 includes: a receiver 201, a type acquisitor 202 and a sender 203.

The receiver 201 is configured to receive an image of a target object.

The image of the target object may be a normal two-dimensional image, such as a color image or a black-and-white image, and the color image may be an RGB image.

Optionally, the receiving action described above may be receiving the image from a storage device, the storage device may be a RAM, a flash memory and the like, and the image described above may be captured by an image capturing device and stored in the above-mentioned storage device.

The number of the above-mentioned target objects may be plural, such as a bag of apples.

The type acquisitor 202 is configured to acquire the type of the target object according to a first classifier and the image of the target object.

The first classifier may be a neural network classifier or a Bayesian network classifier. The neural network classifier or the Bayesian network classifier may be pre-trained, and the output thereof may be types, or at least one type and a confidence level corresponding to the at least one type.

The sender 203 is configured to send information containing the type of the target object to a display device.

Optionally, the sender is specifically configured to send information of the type of the target object to the display device, wherein a confidence level of the information of the type of the target object is greater than or equal to the first threshold. Specifically, when the output of the classifier described above is at least one type and a confidence level corresponding to the at least one type, the first threshold may be set in advance. For example, the first threshold may be set as 0, namely, any possible type information can be sent to the display device to display for the staff to select. The first threshold may also be set as other values to narrow the selection range; or only the type information with the highest confidence level may be sent to the display device; or subcategory information under the main category of the type with the highest confidence level may be sent to the display device. For example, if the type with the highest confidence level is Red Fuji Apple, the type information of the subcategory of Apple (e.g. Red Fuji Apple and Guoguang Apple etc.) is sent to the display device for reference or selection by the staff. Optionally, the classifier may be a Bayesian network classifier.

Optionally, the sender is further configured to send subcategory information under the main category of the type of the target object to the display device. Specifically, when the output of the above-mentioned first classifier is type information, the subcategory information under the main category of the output type may be sent to the display device. For example, if the type is Red Fuji Apple, the type information of the subcategory of Apple (e.g. Red Fuji Apple and Guoguang Apple etc.) is sent to the display device for reference or selection by the staff. Optionally, the classifier may be a neural network classifier. The above-mentioned subcategory information may be sent together with the type information of the target object.

Optionally, the sender is further configured to send attribute information related to the type of the target object to the display device. The attribute information includes at least one item listed below: price, place of origin, number, stock-in time, and expiration date of the target object. Specifically, the related attribute information is searched in the database according to the obtained type information and the found attribute information is sent to the display device. For example, when the type information to be sent includes Red Fuji Apple and Guoguang Apple, the information such as the price, place of origin, number, stock-in time, expiration date and the like are searched and sent to the display device. The attribute information described above may be sent together with at least one item listed below: subcategory information described above and/or type information of the target object.

Preferably, the expiration date described above can be calculated according to at least one item listed below: the type of the target object, the stock-in time of the target object, a current freshness of the target object, and an air temperature. The current freshness of the target object is calculated according to a second classifier and the image of the target object. Specifically, the second classifier may be pre-trained by captured pictures of the target objects (e.g. fruits, etc.) with different freshness types. The above-mentioned freshness types may be classified according to different storage times of fruits, vegetables or the like from freshness to corruption. For example, the interval of the storage times of two adjacent types is one week. In this way, the expiration date may also be estimated when the classification is obtained. Moreover, the expiration date may be adjusted according to the effect of air temperature on the freshness of fruits, vegetables, and the like. For example, the adjusted value is obtained by statistical methods. The device further includes a printer configured to print the expiration date.

The device further includes a detector, and the detector is configured to detect the number of the types of the target objects according to the first classifier and the image of the target object and send alarm information to the display device if the number of the types of the target objects is greater than or equal to two. The detector is specifically configured to detect the type of at least one of the target object according to the first classifier and the image of the target object and send the alarm information to the display device if at least one of the following conditions is satisfied: confidence levels of at least two types are greater than or equal to a second threshold, differences between the confidence levels of at least two types and confidence levels of other types are greater than or equal to a third threshold, and deviations between the confidence levels of at least two types and confidence levels of other types are greater than or equal to a fourth threshold. Optionally, the deviation described above may be a variance or an equivalent parameter thereof. Optionally, the first classifier may be a Bayesian network classifier. When the first classifier directly outputs the types and there are two or more types, the alarm information is sent to the display device. Optionally, the above-mentioned first classifier may be a neural network classifier. In this way, when a customer mistakenly takes different types of goods (e.g. fruits), he/she can be reminded when the price of the different types of goods in a bag is calculated.

The first classifier described above may be obtained by pre-training according to images of different types of target objects and stored. For example, fruits such as apples, pears, etc. and different types of vegetables etc.

The method of the present invention may be applied to an electronic weighing device used in a supermarket, and only an image capturing device needs to be installed on the electronic weighing device. The method of the present invention may also be applied to other devices, which is not limited in the present invention.

The detection method provided by the embodiment of the present invention can automatically prompt the product type, reduce the time of manual recognition, and increase the accuracy of the recognition.

Figure 3:
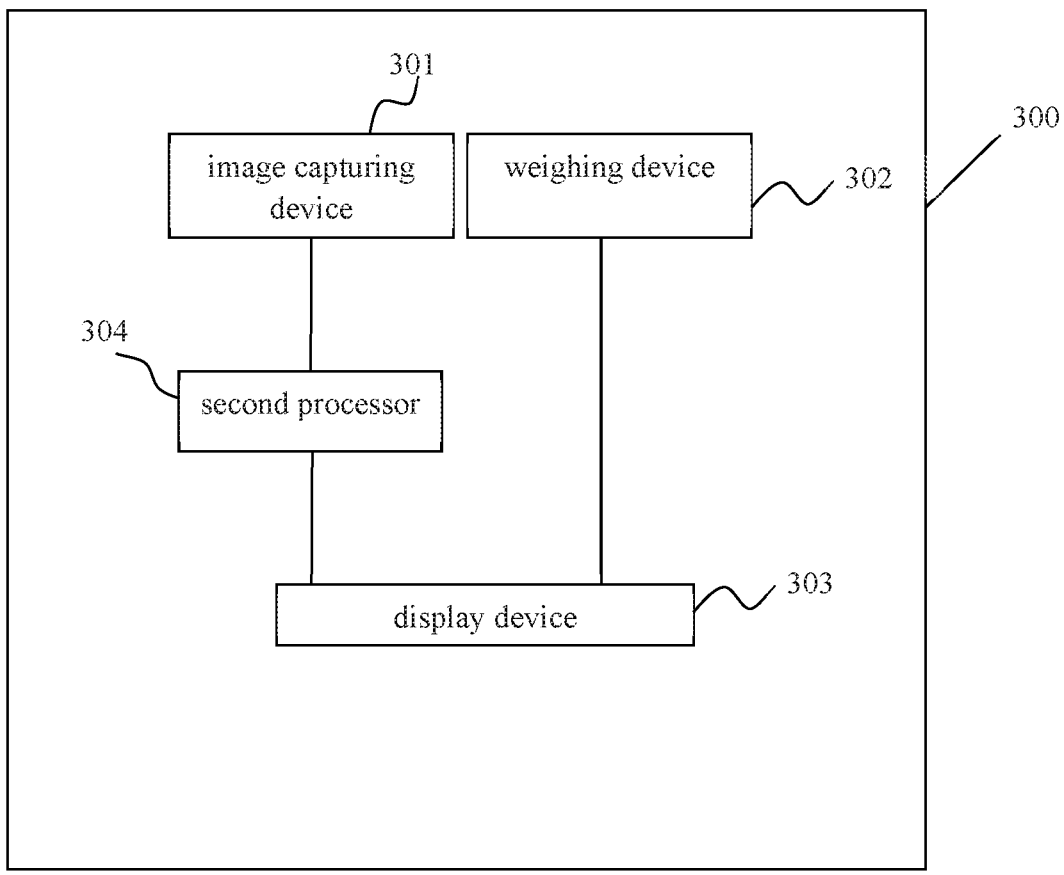
FIG. 3 is a structural schematic diagram of a detection system according to embodiment three of the present invention.

A detection system 300 according to the embodiment three of the present invention is described in detail below with reference to FIG. 3. The system 300 includes: an image capturing device 301, a weighing device 302, a display device 303, and a second processor 304.

The image capturing device 301 is configured to acquire an image of a target object, and the weighing device 302 is configured to acquire a weight of the target object.

The image of the target object may be a normal two-dimensional image, such as a color image or a black-and-white image, and the color image may be an RGB image.

The number of the target objects described above may be plural, such as a bag of apples.

The second processor 304 is configured to acquire a type of the target object according to a first classifier and the image of the target object, and send the type of the target object and the weight of the target object to the display device.

The first classifier may be a neural network classifier or a Bayesian network classifier. The neural network classifier or the Bayesian network classifier may be pre-trained, and the output thereof may be types, or at least one type and a confidence level corresponding to the at least one type.

The display device 303 is configured to display the type of the target object and the weight of the target object.

The second processor is specifically configured to send information of the type of the target object to the display device, wherein a confidence level of the information of the type of the target object is greater than or equal to a first threshold. The sending action described above may be the case that the second processor sends information to the display device through an interface. Specifically, when the output of the classifier described above is at least one type and a confidence level corresponding to the at least one type, the first threshold may be set in advance. For example, the first threshold may be set as 0, namely, any possible type information can be sent to the display device to display for the staff to select. The first threshold may also be set as other values to narrow the selection range; or only the type information with the highest confidence level may be sent to the display device; or subcategory information under the main category of the type with the highest confidence level may be sent to the display device. For example, if the type with the highest confidence level is Red Fuji Apple, the type information of the subcategory of Apple (e.g. Red Fuji Apple and Guoguang Apple etc.) is sent to the display device for reference or selection by the staff. Optionally, the classifier may be a Bayesian network classifier.

The second processor is further configured to send subcategory information under the main category of the type of the target object to the display device. Specifically, when the output of the above-mentioned first classifier is type information, the subcategory information under the main category of the output type may be sent to the display device. For example, if the type is Red Fuji Apple, the type information of the subcategory of Apple (e.g. Red Fuji Apple and Guoguang Apple etc.) is sent to the display device for reference or selection by the staff. Optionally, the classifier may be a neural network classifier. The above-mentioned subcategory information may be sent together with the type information of the target object.

The second processor is further configured to send attribute information related to the type of the target object to the display device. The attribute information includes at least one of the following: price, place of origin, number, stock-in time, and expiration date of the target object. Specifically, the related attribute information is searched in the database according to the obtained type information and the found attribute information is sent to the display device. For example, when the type information to be sent includes Red Fuji Apple and Guoguang Apple, the information such as the price, place of origin, number, stock-in time, expiration date and the like are searched and sent to the display device. The attribute information described above may be sent together with at least one item listed below: subcategory information described above and/or type information of the target object.

Preferably, the expiration date is calculated according to at least one item listed below: the type of the target object, the stock-in time of the target object, a current freshness of the target object, and an air temperature. The current freshness of the target object is calculated according to a second classifier and the image of the target object. Specifically, the second classifier may be pre-trained by captured pictures of the target objects (e.g. fruits, etc.) with different freshness types. The above-mentioned freshness types may be classified according to different storage times of fruits, vegetables or the like from freshness to corruption. For example, the interval of the storage times of two adjacent types is one week. In this way, the expiration date may also be estimated when the classification is obtained. Moreover, the expiration date may be adjusted according to the effect of air temperature on the freshness of fruits, vegetables, and the like. For example, the adjusted value is obtained by statistical methods. The system further includes a printer configured to print the expiration date.

The second processor is further configured to detect the number of the types of the target objects according to the first classifier and the image of the target object and send alarm information to the display device if the number of the types of the target object is greater than or equal to two. The second processor is specifically configured to detect the at least one type of the target object according to the first classifier and the image of the target object and send the alarm information to the display device if at least one of the following conditions is satisfied: confidence levels of at least two types are greater than or equal to a second threshold, differences between the confidence levels of at least two types and confidence levels of other types are greater than or equal to a third threshold, and deviations between the confidence levels of at least two types and confidence levels of other types are greater than or equal to a fourth threshold. Optionally, the deviation described above may be a variance or an equivalent parameter thereof. Optionally, the first classifier may be a Bayesian network classifier. When the first classifier directly outputs the types and there are two or more types, the alarm information is sent to the display device. Optionally, the first classifier may be a neural network classifier. In this way, when a customer mistakenly takes different types of goods (e.g. fruits), he/she can be reminded when the price of the different types of goods in a bag is calculated.

The first classifier described above may be obtained by pre-training according to images of different types of target objects and stored. For example, fruits such as apples, pears, etc. and different types of vegetables etc.

The method of the present invention may be applied to an electronic weighing device used in a supermarket, and only an image capturing device needs to be installed on the electronic weighing device. The method of the present invention may also be applied to other devices, which is not limited in the present invention.

The detection system according to the embodiment of the present invention can automatically prompt the product type, thereby reducing the time of manual recognition, and increasing the accuracy of the recognition.

Figure 4:
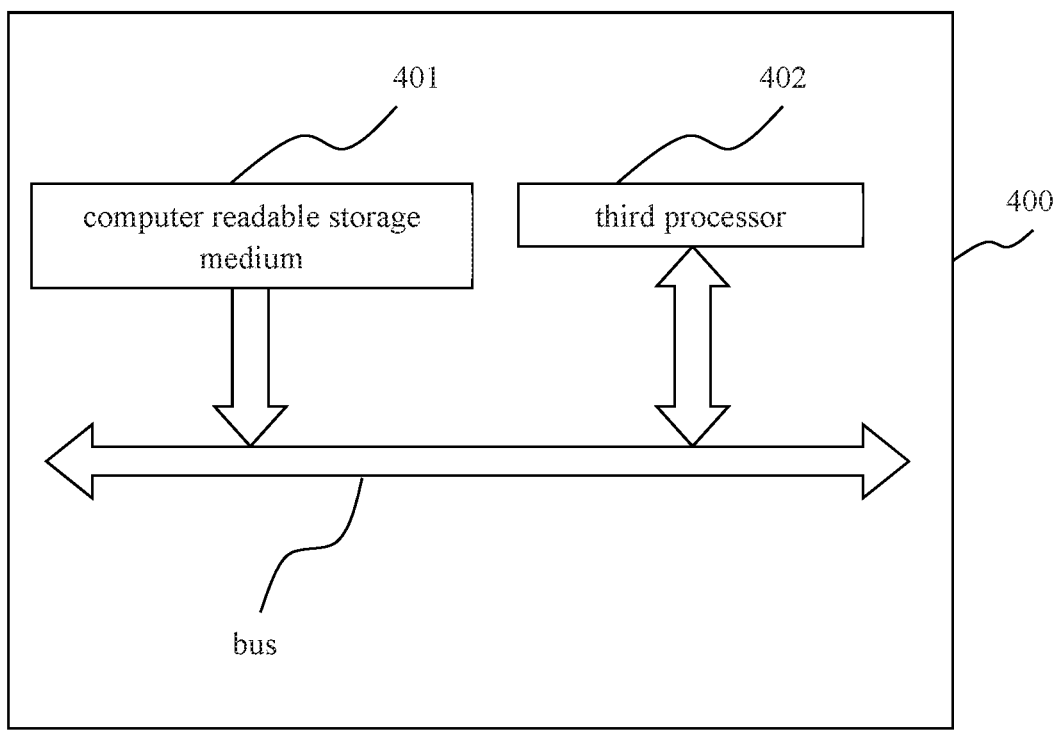
FIG. 4 is a structural schematic diagram of another detection device according to embodiment four of the present invention.

A detection device 400 according to the embodiment four of the present invention is described in detail below with reference to FIG. 4. The device 400 includes a computer readable storage medium 401, and the computer readable storage medium 401 stores computer programs. When the computer programs are executed by a third processor 402, steps of the method described in embodiment one are implemented. As shown in FIG. 4, optionally, the device 400 may include a bus.

The detection device according to the embodiment of the present invention can automatically prompt the product type, thereby reducing the time of manual recognition, and increasing the accuracy of the recognition.

Figure 5:
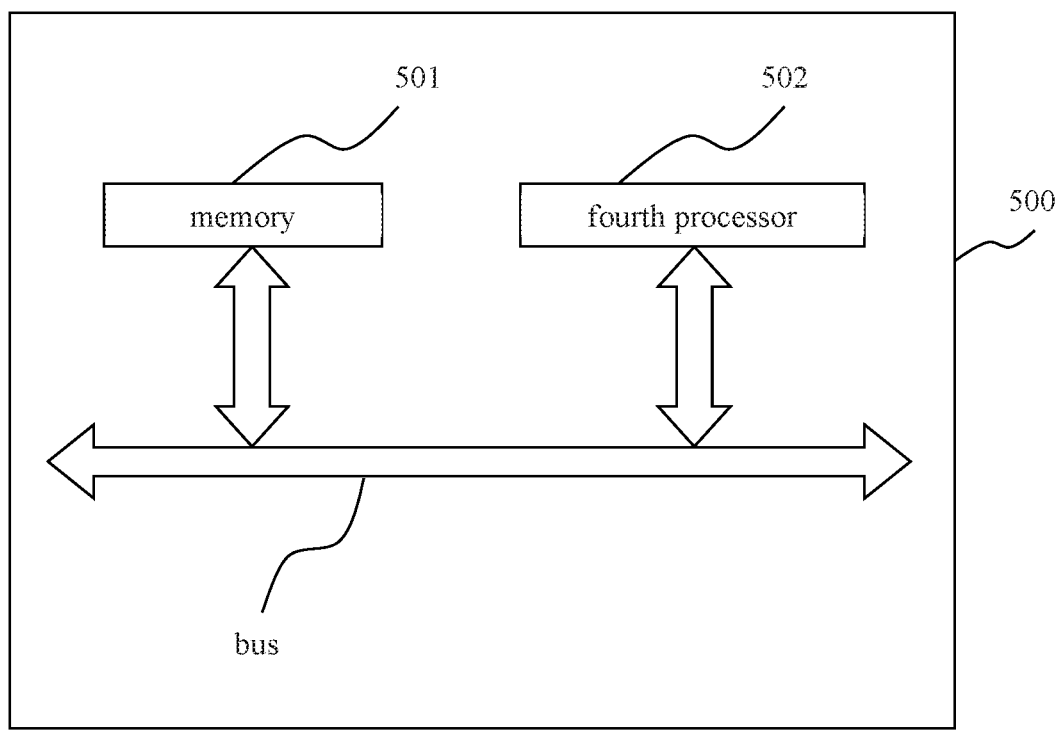
FIG. 5 is a structural schematic diagram of yet another detection device according to embodiment five of the present invention.

A detection device 500 according to the embodiment five of the present invention is described in detail below with reference to FIG. 5. The device 500 includes a memory 501, a fourth processor 502, and computer programs stored in the memory 501 and executable by the fourth processor 502. When the computer programs are executed by the fourth processor 502, steps of the method described in embodiment one are implemented. Optionally, as shown in FIG. 5, the device 500 may include a bus.

The detection system according to the embodiment of the present invention can automatically prompt the product type, thereby reducing the time of manual recognition, and increasing the accuracy of the recognition.

In the above embodiments, a depth value test may be added to the calibration process, so a depth map can be obtained while infrared images and color images are captured. The depth value of the calibration plate without any rotation in the depth image is compared with the actually measured value. If the difference is less than the specified error range, the calibration can be continued. If the difference is greater than the specified error range, the depth sensor needs to be corrected and then the calibration is performed again.

Exemplarily, the computer programs may be divided into one or more modules/units that are stored in the memory and executed by the processor to perform the present invention. The one or more modules/units may be a series of computer program instruction segments capable of performing specific functions, and the instruction segments are used to describe the execution process of the computer programs in the device/terminal device.

The device/terminal device may be a computing device such as a mobile phone, a tablet computer, a desktop computer, a laptop, a palmtop computer, a cloud server and the like. The device/terminal device may include, but not limited to, a processor and a memory. It will be understood by those skilled in the art that the schematic diagram of the present invention merely shows an example of the device/terminal device which does not limit the device/terminal device. The device/terminal device may include more or less components, a combination of certain components, or different components than those shown in the drawings. For example, the device/terminal device may further include an input/output device, a network access device, a bus, and the like.

The above-mentioned processor may be a central processing unit (CPU), or may be another general purpose processor, such as a digital signal processor (DSP), an application specific integrated circuit (ASIC), a field-programmable gate array (FPGA), or other programmable logic device, such as a discrete or transistor logic device, a discrete hardware component, and the like. The general-purpose processor may be a microprocessor or any conventional processor etc. The processor is a control center of the device/terminal device, which connects various parts of the entire device/terminal device by various interfaces and lines.

The memory may be used to store the computer programs and/or modules. The processor realizes various functions of the device/terminal device by running or executing the computer programs and/or modules stored in the memory and invoking data stored in the memory. The memory may include a program storage area and a data storage area. In detail, the program storage area may store an operating system, an application required to realize at least one function (such as an image playing function, etc.), and the like. The data storage area may store data (such as video data, images, etc.) created during the use of the mobile phone, etc. In addition, the memory may include a high-speed random-access memory. Also, the memory may include a non-volatile memory, such as hard disk, memory, plug-in hard disk, smart media card (SMC), secure digital (SD) card, flash card, and at least one disk storage device, flash memory device, or other volatile solid memory devices.

The modules/units integrated by the device/terminal device can be stored in a computer readable storage medium if they are implemented in the form of software functional units and sold or used as a stand-alone product. Based on such understanding, implementation of all or part of the processes of the methods according to the above-mentioned embodiments of the present invention can also be realized by computer programs which instruct related hardware. The computer programs may be stored in a computer readable storage medium. When the computer programs are executed by the processor, the steps of the various methods according to the above-mentioned embodiments can be implemented. In detail, the computer programs include computer program code, which may be in the forms of source code, object code, executable file, or some intermediate forms etc. The computer readable storage medium may include: any solid or device capable of carrying the computer program codes, recording medium, USB flash disk, removable hard disk, magnetic disk, optical disk, computer memory, read-only memory (ROM), random access memory (RAM), electrical carrier signal, telecommunication signal, and software distribution medium, etc.

The imaging of the target object in the above-mentioned embodiments may be local or integral imaging. Both of the local and integral imaging are suitable for the method or device provided by the present invention. The local or integral imaging will be suitable for the method or device provided by the present invention after some corresponding modifications. These modifications can be derived by those of ordinary skill in the art without creative efforts, so they should be considered as falling within the scope of the present invention.

What is claimed is:

1. A detection method comprising:
   acquiring an image of a target object;
   acquiring a weight of the target object using an electronic weighing device;
   acquiring a type of the target object according to a first classifier and the image of the target object, wherein the first classifier is a neural network classifier or a Bayesian network classifier and output thereof is types or at least one type and a confidence level corresponding to the types or the at least one type;
   sending the type of the target object and the weight of the target object to a display device, and displaying the type of the target object and the weight of the target object,
   wherein subcategories under a main category of the type of the target object are sent to the neural network or Bayesian first classifier and the display device to automatically prompt the type of the target object for reference or selection.

2. The method of claim 1, wherein sending the information containing the type of the target object to the display device comprises:
sending the information containing the type of the target object to the display device, wherein a confidence level of the information containing the type of the target object is greater than or equal to a first threshold.

3. The method of claim 1, wherein the method further comprises:
sending attribute information related to the type of the target object to the display device.

4. The method of claim 3, wherein the attribute information comprises at least one item listed below: a price of the target object, a place of origin of the target object, a stock-in time of the target object, and an expiration date of the target object.

5. The method of claim 4, wherein the method further comprises:
printing the expiration date.

6. The method of claim 1, wherein the expiration date is calculated according to at least one item listed below: the type of the target object, the stock-in time of the target object, a current freshness of the target object, and an air temperature.

7. The method of claim 6, wherein the current freshness of the target object is calculated according to a second classifier and the image of the target object.

8. The method of claim 1, wherein the method further comprises:
detecting a number of types of target objects according to the first classifier and the image of the target object and sending alarm information to the display device if the number of the types of the target objects is greater than or equal to two.

9. The method of claim 8, wherein detecting the number of the types of the target objects according to the first classifier and the image of the target object and sending the alarm information to the display device if the number of the types of the target objects is greater than or equal to two comprises:
detecting at least one type of the target object according to the first classifier and the image of the target object, and sending the alarm information to the display device if at least one of the following conditions is satisfied: confidence levels of at least two types are greater than or equal to a second threshold, differences between the confidence levels of the at least two types and confidence levels of other types are greater than or equal to a third threshold, and deviations between the confidence levels of the at least two types and the confidence levels of other types are greater than or equal to a fourth threshold.

10. A non-transitory computer readable storage medium, wherein the non-transitory computer readable storage medium stores computer programs, and wherein, when the computer programs are executed by a third processor, steps of the method of claim 1 are implemented.

11. A device for image processing, comprising a memory, a fourth processor, and computer programs stored in the memory and executed by the fourth processor, wherein, when the computer programs are executed by the fourth processor, steps of the method of claim 1 are implemented.

12. A detection device comprising:
an image capturing device configured to acquire an image of a target object;
an electronic weighing device configured to acquire a weight of the target object;
a second processor configured to acquire a type of the target object according to a first classifier and the image of the target object, and send the type of the target object and the weight of the target object to a display device, the first classifier is a neural network classifier or a Bayesian network classifier and output thereof is types or at least one type and a confidence level corresponding to the types or the at least one type; and
a display device configured to display the type of the target object and the weight of the target object,
wherein subcategories under a main category of the type of the target object are sent to the neural network or Bayesian first classifier and the display device to automatically prompt the type of the target object for reference or selection.

13. The device of claim 12, wherein the sender is specifically configured to send information containing the type of the target object to the display device, wherein a confidence level of the information containing the type of the target object is greater than or equal to a first threshold.

14. The device of claim 12, wherein the sender is further configured to send attribute information related to the type of the target object to the display device.

15. The device of claim 14, wherein the attribute information comprises at least one item listed below: a price of the target object, a place of origin of the target object, a stock-in time of the target object, and an expiration date of the target object.

16. The device of claim 12, wherein the device further comprises a detector; and the detector is configured to detect a number of types of target objects according to the first classifier and the image of the target object and send alarm information to the display device if the number of the types of the target objects is greater than or equal to two.

17. The device of claim 16, wherein the detector is specifically configured to detect at least one type of the target object according to the first classifier and the image of the target object, and send the alarm information to the display device if at least one of the following conditions is satisfied: confidence levels of at least two types are greater than or equal to a second threshold, differences between the confidence levels of the at least two types and confidence levels of other types are greater than or equal to a third threshold, and deviations between the confidence levels of the at least two types and the confidence levels of other types are greater than or equal to a fourth threshold.

18. A detection system comprising: an image capturing device, a weighing device, a display device, and a second processor, wherein
the image capturing device is configured to acquire an image of a target object;
the weighing device is configured to acquire a weight of the target object;
the second processor is configured to acquire a type of the target object according to a first classifier and the image of the target object, and send the type of the target object and the weight of the target object to the display device, the first classifier is a neural network classifier or a Bayesian network classifier and output thereof is types or at least one type and a confidence level corresponding to the types or the at least one type; and
the display device is configured to display the type of the target object and the weight of the target object,
wherein subcategories under a main category of the type of the target object are sent to the neural network or Bayesian first classifier and the display device to automatically prompt the type of the target object for reference or selection.

* * * * *